March 13, 1956 J. C. TRAVILLA 2,737,906
RAILWAY TRUCK

Filed June 21, 1952 2 Sheets-Sheet 1

INVENTOR.
James C. Travilla
BY
Rodney Bedell
ATTORNEY

March 13, 1956  J. C. TRAVILLA  2,737,906
RAILWAY TRUCK

Filed June 21, 1952  2 Sheets-Sheet 2

INVENTOR.
James C. Travilla
BY Rodney Bedell
ATTORNEY

# United States Patent Office 2,737,906
Patented Mar. 13, 1956

2,737,906

RAILWAY TRUCK

James C. Travilla, University City, Mo., assignor to General Steel Castings Corporation, Granite City, Ill., a corporation of Delaware Application June 21, 1952, Serial No. 294,835

5 Claims. (Cl. 105—197.1)

The invention relates to railway rolling stock and more particularly to railway trucks and is embodied in a four wheel motor truck having equalizers and a combination of leaf springs and upright coil springs thereon mounting the truck frame.

It is desirable in such a truck to receive the opposite ends of the upright coil springs in the equalizer and truck frame structure respectively. To provide a greater amount of flexibilty in the coil springs than can be obtained with a limited diameter single coil spring unit, it is necessary to use coil spring units arranged side by side in a direction longitudinally of the truck. This avoids the necessity of widening the parts of the equalizer and truck frame which receive the coil springs and of consequent interference with other truck parts, such as brake rigging. A plurality of coil springs arranged side by side make it possible to carry a greater proportion of the load on the coil springs and hence the semi-elliptic spring may be made more flexible.

The main object of the invention is to provide for comfortable riding, safety against derailments, and reduction in wear of the truck parts, particularly the wear of the brake parts.

Another object of the invention is to so arrange the coil springs, equalizer, and truck frame side members or wheel pieces so as to accommodate a plurality of coil spring units adequate to give the desired flexibility to the spring system and at the same time provide adequate strength in the frame adjacent to the spring pockets without unduly increasing the weight of the frame.

Another object is to adapt the frame and spring assembly so as to accommodate brake hangers suspended from the truck frame adjacent to the upright coil springs without affecting the desired positioning of the springs, frame wheel pieces, and associated parts.

These and other detailed objects of the invention as will appear below are attained by the structure illustrated in the accompanying drawings, in which.

Figure 1:
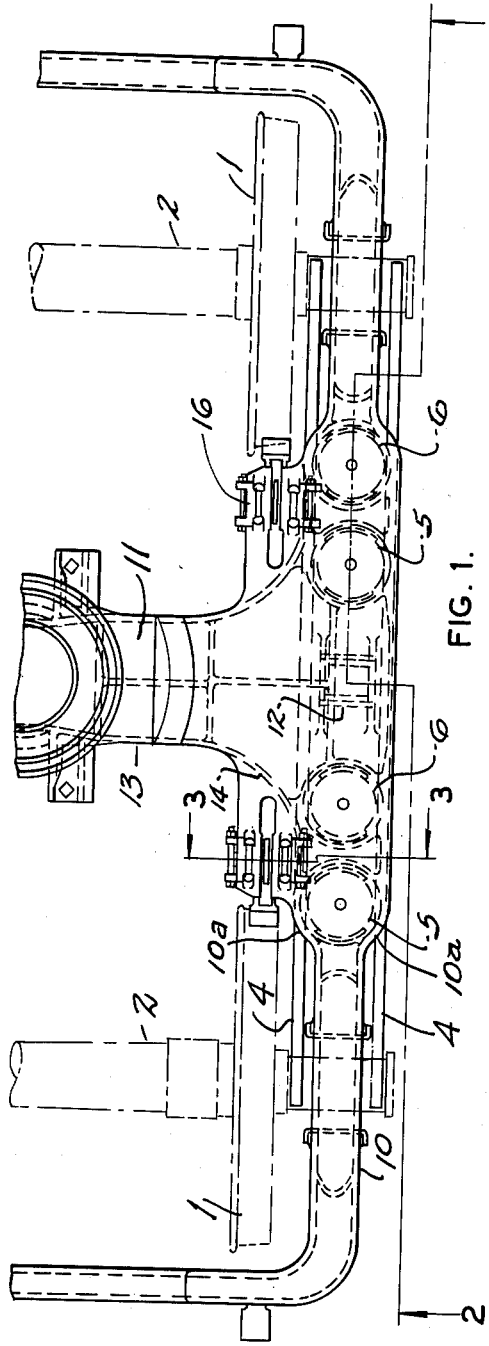
Figure 1 is a longitudinal half of a truck embodying the invention.
Figure 2:
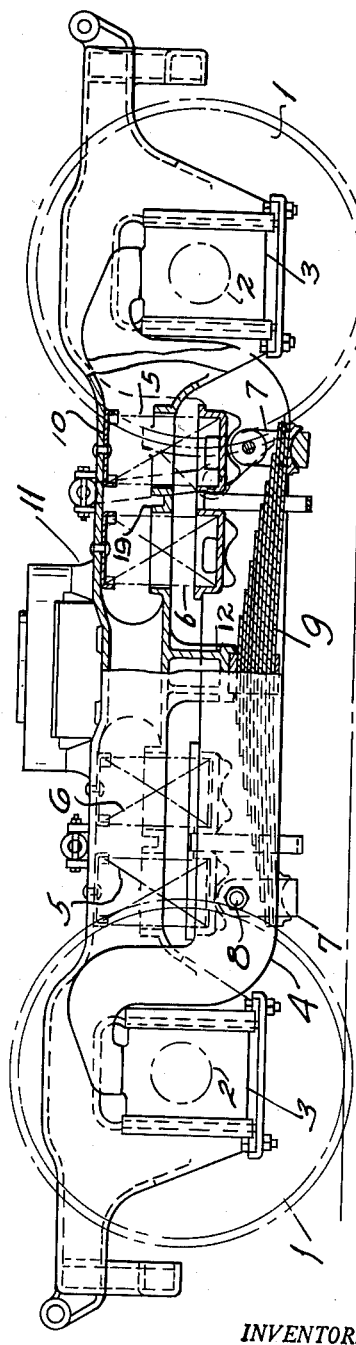
Figure 2 is a side elevation of the structure shown in Figure 1, a portion being sectioned on the line 2—2 of Figure 1.
Figure 3:
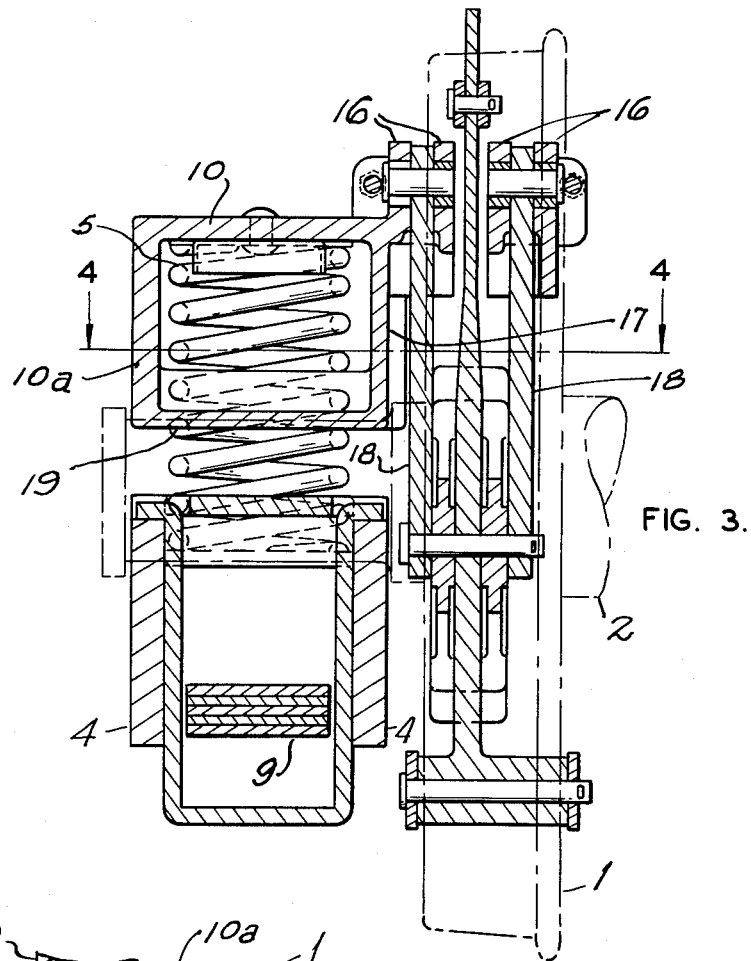
Figure 3 is a vertical transverse section taken on the line 3—3 of Figure 1 and drawn to an enlarged scale.
Figure 4:
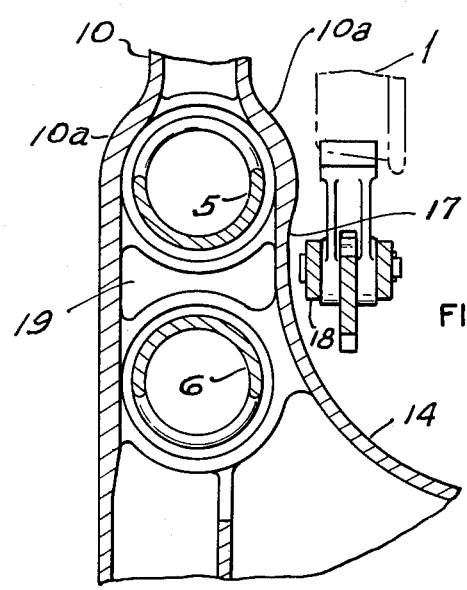
Figure 4 is a detailed horizontal section taken on the line 4—4 of Figure 3.

The truck includes the usual assemblies of wheels 1, axles 2 and journal boxes 3. Drop equalizer bars 4 extend between and are mounted upon journal boxes 3. Seated upon equalizer bars 4 are groups of upright coil spring units 5, 6, each group being positioned between one of the wheel-axle assemblies and the middle of the truck. Links 7 are suspended at 8 from the equalizer bars immediately beneath the springs 5 near the adjacent wheel-axle assemblies and an elongated leaf spring 9 is carried at its ends upon links 7.

A truck frame, preferably in the form of a one-piece casting, includes side members or wheel pieces 10 and a transverse body-mounting bolster 11 integral with the wheel pieces. The wheel pieces are of box cross section substantially throughout their length and the side walls of the wheel pieces are bulged outwardly as indicated at 10a to accommodate the extension of the upper ends of the coil springs 5, 6 into the wheel piece. The lower wall of the wheel piece has spaced circular recesses to accommodate the upper ends of coil springs 5, 6. At the middle of the truck, each wheel piece has a downwardly extending bracket 12 bearing upon the middle portion of leaf spring 9.

Brake hanger brackets 16 extend inwardly of the truck away from the top of each wheel piece and lengthwise of the truck away from the top of the bolster. The bolster has upright side walls 13, each including an arcuate portion 14 concaved about the outside brake hanger 18 so as to clear the same and merging with an indentation 17 in the inner side wall of the wheel piece. The bolster side walls brace each wheel piece at the point intermediate springs 5, 6 where it is weakened by the spaced openings in its lower wall to receive the two coil springs and where it must resist the forces resulting from application of the brakes. This portion of the wheel piece is also strengthened by a transverse brace 19 between the lower portions of the side walls and between springs 5, 6 which provides the wheel piece with a box section at this point having the width and depth of the wheel piece and avoids a single elongated opening for two spaced springs. An elongated opening would seriously weaken this portion of the wheel piece unless it is heavily reinforced by thickening the walls and adding additional flanges, and if this were done the springs would be more limited in diameter unless the wheel piece was widened, which would be objectionable because of the necessity of clearing the brake hanger. Brace 19, being adjacent the brake hanger brackets, also reinforces the structure for supporting the brake hangers with a minimum amount of weight.

With this arrangement the truck designer may vary the characteristics of the leaf springs and the coil springs as desired, making the leaf springs more flexible and increasing the loads on the coil spring units.

These advantages are attained without increasing the truck wheel base over what would be required for a single coil spring unit between the middle of the truck and each wheel-axle assembly. The merging of the bolster with the portion of the wheel piece mounted on the springs and carrying the brake hanger bracket and the associated bracing of the lower portions of the sides of the wheel piece, avoid the necessity of unduly thickening the walls of the wheel piece and increasing the weight and cost of the frame. The arrangement also avoids interference with the brake hanger disposed between the general vertical plane of the wheel and the adjacent wheel piece.

All of the above described features contribute to the easy riding qualities of the truck, making it possible to operate the vehicle at higher speeds with comfort to the persons carried by the vehicle. The arrangement also provides for safety against derailment and the minimum wear of the truck parts, particularly wear of the brake parts.

The details of the structure may be varied substantially without departing from the spirit of the invention and the exclusive use of those modifications coming within the scope of the claims is contemplated.

What is claimed is:

1. In a railway truck, a truck frame, spaced wheel and axle assemblies, brake heads with shoes applicable to the treads of the wheels of each assembly, a brake hanger suspending each brake head from the truck frame, equalizer structure extending between and mounted on the assemblies, a pair of upright coil spring units arranged side by side longitudinally of the equalizer structure between each end of the equalizer and the middle of the truck, the truck frame including a longitudinal side member above the equalizer and structure mounted on said coil spring units, said side member having upright side walls spaced apart transversely of the truck, the major portion of said side member being of less width than the diameter of one of said coil spring units, the inner of said walls being bulged inwardly of the truck around said coil spring units but having an indented portion extending outwardly of the truck between said spring units to clear the adjacent brake hanger, the truck frame including a body-mounting transverse bolster having side walls merging with said indented portions of the frame side member inner side walls, said indented portions and bolster side walls being concaved away from and about said brake hangers to accommodate movement of the latter.

2. In a railway truck, spaced wheel and axle assemblies, brake heads with shoes applicable to the wheel treads nearer the middle of the truck, equalizer structure supported from said assemblies outboard of the wheels, a truck frame including box shaped wheel pieces overlying said equalizer structure, brake hanger brackets extending inwardly from the wheel pieces over said brake heads, brake hangers suspending said brake heads from the brackets, a pair of adjacent upright coil spring units mounted on each equalizer structure and arranged side by side longitudinally of the equalizer structure and abreast of each of said brake heads, the lower wall of each wheel piece having an opening receiving the upper end of each coil spring, the frame including a body-mounting bolster with upright side walls concaved around the brake hangers to clear the same and merging with the inner side walls of the wheel pieces opposite to each pair of upright coil springs, each wheel piece including a complete box section between adjacent coil springs.

3. A railway truck structure as described in claim 2 in which the box section between each pair of upright coil springs is in substantial alignment transversely of the truck with the center of the brake hanger bracket and with the merger of the bolster side wall with the inner side wall of the wheel piece.

4. In a railway truck, spaced wheel and axle assemblies, including journal boxes, an equalizer structure extending between and mounted directly on said journal boxes outwardly of the wheels, groups of upright coil spring units mounted on and spaced longitudinally of the equalizer structure, each group comprising a pair of units positioned side by side longitudinally of the equalizer structure, a leaf spring extending longitudinally of the equalizer structure and beneath the coil spring units with its ends supported on the equalizer structure beneath the coil spring units, a load-carrying truck frame including a hollow wheel piece overlying said equalizer structure with its middle portion supported on the middle part of said leaf spring and with portions spaced from its middle portion receiving and being supported on said coil spring units, the truck frame also including a bolster extending between and rigid with said wheel pieces and having a body-mounting center plate, brake hanger brackets projecting from the bolster and the spring-receiving and spring-supported portions of each wheel piece, and double brake hangers suspended from each of said brackets.

5. In a railway truck, spaced wheel and axle assemblies, including journal boxes, equalizer structure extending between and mounted directly on said journal boxes, a pair of upright coil spring units arranged side by side longitudinally of the equalizer between each end of the equalizer and the middle of the truck, a truck frame including a wheel piece with top and side walls receiving and mounted on the upper ends of said coil spring units and including a body-mounting bolster extending transversely of said wheel piece and having side walls, there being upright arcuate webs merging with each bolster side wall and an inner side wall of a wheel piece intermediate the corresponding pair of spring units, and a brake hanger bracket projecting inwardly of the truck from said web, a pair of parallel brake hangers suspended from each bracket, the outer face of each of said arcuate webs being recessed to clear a brake hanger suspended from the adjacent bracket.

References Cited in the file of this patent

UNITED STATES PATENTS

| | | |
|---|---|---|
| 2,137,074 | Blomberg | Nov. 15, 1938 |
| 2,208,425 | Kjolseth | July 16, 1940 |
| 2,234,414 | Orr | Mar. 11, 1941 |
| 2,253,407 | Wallace | Aug. 19, 1941 |
| 2,317,169 | Bartell | Apr. 20, 1943 |